United States Patent [19]

Spivack

[11] 3,742,096

[45] June 26, 1973

[54] PHOSPHINIC ACIDS AND ESTERS OF ALKYLATED P-HYDROXYPHENYLALKANES

[75] Inventor: John Denon Spivack, Spring Valley, N.Y.

[73] Assignee: Ciba-Geigy Corporation, Ardsley, N.Y.

[22] Filed: Sept. 30, 1970

[21] Appl. No.: 76,998

Related U.S. Application Data

[63] Continuation-in-part of Ser. No. 618,988, Feb. 27, 1967, Pat. No. 3,534,127, which is a continuation-in-part of Ser. No. 612,336, Jan. 30, 1967, Pat. No. 3,488,368.

[52] U.S. Cl. .............. 260/953, 252/400, 260/45.95, 260/502.4 R
[51] Int. Cl. ............................................. C07f 9/02
[58] Field of Search .......................... 260/953, 502.4

[56] References Cited
UNITED STATES PATENTS

| | | | |
|---|---|---|---|
| 3,270,091 | 8/1966 | Spivack | 260/953 X |
| 3,281,505 | 10/1966 | Spivack | 260/953 |
| 3,310,575 | 3/1967 | Spivack | 260/953 X |
| 3,367,870 | 2/1968 | Spivack | 260/953 X |

Primary Examiner—Joseph P. Brust
Attorney—Karl F. Jorda and Nestor W. Shust

[57] ABSTRACT

Phosphinic acids and their esters of alkylated p-hydroxyphenylalkanes are prepared from alkylated p-hydroxyphenyl-alkyl halides and phosphorus halides in the presence of a complexing metal halide Lewis acid followed by a dissociation of the reaction complex with water to form the corresponding phosphinic acid or with an alcohol followed by water to form the corresponding phosphinic ester.

The phosphinic acids are useful as intermediates in preparing the phosphinates which in turn are useful as stabilizers of organic materials which are subject to oxidative deterioration.

8 Claims, No Drawings

PHOSPHINIC ACIDS AND ESTERS OF ALKYLATED P-HYDROXYPHENYLALKANES

CROSS REFERENCES

This is a continuation-in-part of a copending application Ser. No. 618,988, filed Feb. 27, 1967 now U.S. Pat. No. 3,534,127, which is a continuation-in-part of Ser. No. 612,336, filed Jan. 30, 1967, now U.S. Pat. No. 3,488,368.

This invention relates to novel alkylated hydroxyphenyl alkylphosphinic acids and esters thereof. The esters are useful as stabliizers of organic materials which are subject to oxidative deterioration.

The novel alkylated hydroxyphenylalkylphosphinic acids and esters of the present invention are represented by the formula:

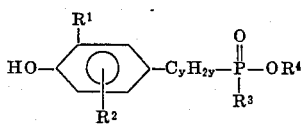

I wherein
  $R^1$ is a lower alkyl group of from one to six carbon atoms,
  $R^2$ is alkyl in a position ortho or meta to the hydroxy group, said alkyl group having up to six carbon atoms,
  $R^3$ is alkyl of from one to 18 carbon atoms or aryl,
  $R^4$ is hydrogen, hydroxy(lower)alkyl, alkenyl of from three to six carbon atoms, halo(lower)alkyl or alkyl of from one to 18 carbon atoms, provided that $R^3$ is not phenyl when $R^4$ is alkyl or hydrogen; and
  $y$ is a number from 1 to 3.

Illustrative examples of lower alky groups which are represented by $R^1$ and $R^2$ are methyl, ethyl, propyl, isopropyl, butyl, t-butyl, pentyl, hexyl. The preferred groups are the tertiary alkyls such as t-butyl and methyl. Illustrative examples of the alkyl groups which are represented by $R^3$ are methyl, ethyl, pentyl, hexyl, octyl, decyl, dodecyl, octadecyl and the like, both straight chains and branched chains. The preferred groups are methyl and ethyl.

The aryl groups which are represented by $R^3$ can be phenyl, naphthyl substituted phenyl such as tolyl and the like.

The alkylated hydroxyphenylalkylphosphinates of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated aldehydes and unsaturated hydrocarbons such as butadienes and styrene; polyolefins such as polyethylene, polypropylene, polybutylene, polyisoprene, and the like, including copolymers of poly-α-olefins, polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene.

Other materials which can be stabilized by the compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like hydrocarbon materials such as gasoline, mineral oil, fuel oil, drying oil, cutting fluids, waxes, resins, and the like, salts of fatty acids such as soaps and the like.

The alkylated hydroxyphenylalkylphosphinic acids of this invention are useful in making the higher alkyl substituted phosphinates such as n-octadecyl(3,5-di-tert.-butyl-4-hydroxybenzyl)-ethane phosphinate which can be used as an antioxidant.

In general, one or more of the stabilizers of the present invention are employed in amounts, in toto, of from about 0.005 to about 5 percent by weight of the composition to be stabilized. A particularly advantageous range of the present stabilizers is from about 0.05 percent to about 2 percent. The preferred range is particularly effective in polyolefins such as polypropylene.

The stabilizers employed in this invention can be also used in combination with other stabilizers or additives. Especially useful co-stabilizers are di-lauryl-beta-thiodipropionate and di-stearyl-beta-thiodipropionate.

The following formula represents co-stabilizers which are in certain instances very useful in combination with the stabilizers of this invention:

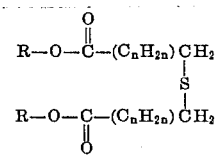

II wherein R is an alkyl group having from 6 to 24 carbon atoms; and $n$ is an integer from 1 to 6. The above co-stabilizers are used in the amount of from 0.01 to 2 percent by weight of the organic material, and preferably from 0.1 to 1 percent.

Other antioxidants, antiozonants, thermal stabilizers, ultraviolet light absorbers, coloring materials, dyes, pigments, metal chelating agents, etc. may also be used in the compositions in combination with the stabilizers of the invention.

The compounds of this invention can be prepared by reacting an alkylated hydroxyphenylalkyl halide of the formula

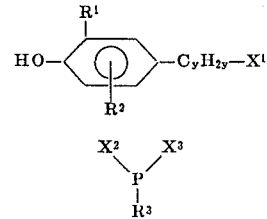

III wherein $R^1$ and $R^2$ and $y$ are as defined above, and $X^1$ is chloro, bromo or iodo, in a nonequeous inert aprotic solvent, with a phosphorus halide (alternatively named as a holophosphine) of the formula

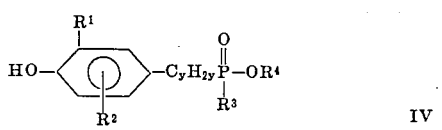

$$\text{IV}$$

wherein each of $X^2$ and $X^3$ is chloro, bromo or iodo and $R^3$ is alkyl or aryl in the presence of a complexing metal halide Lewis acid. The resultant reaction complex is then treated with an equivalent amount of a compound of the formula $HOR^4$ wherein $R^4$ is hydrogen, alkyl, haloalkyl, alkenyl, hydroxyalkyl aryl or aralkyl. This reaction product is then dissociated through the treatment with at least an equivalent amount of $H_2O$.

In the case wherein $R^4$ is hydrogen, the reaction complex obtained from the reaction of the dihalophosphine and the compound of Formula III will require at least two equivalents of $H_2O$ and preferably an excess of this amount to yield the corresponding phosphinic acid. If one equivalent of $H_2O$ is used, the product will be the corresponding phosphorylmonohalide.

With greater particularity to the nature of the reactants and conditions in preparing the compounds of the present invention, the alkylated hydroxyphenylalkyl halide reactant of Formula III can be a chloride, bromide or iodide, but preferably a chloride. Bridging the halogen atom and the phenyl ring is an alkylene chain of from one to about three carbon atoms. In its simplest form, this alkylene group is methylene, which together with the phenyl ring thus constitutes a benzyl group. The preferred alkylene groups are methylene and ethylene. The phenyl ring contains a hydroxy group in the para position and an alkyl group represented by $R^1$ on one of the adjacent carbon atoms. A second like or different alkyl group represented by $R^2$ is present on the other carbon atom adjacent to the hydroxy group or on the carbon atom meta to the hydroxy group and para to the first alkyl group. Generally, however, the alkyl groups contain a maximum of up to about six carbon atoms. The 3,5-di-t-butyl-4-hydroxyphenyl group is most preferred.

The phosphorus halide reactant of Formula IV is a dihalophosphine in which the halogen atom(s) is chlorine, bromine, or iodine. Although not required, the halogens in a dihalophosphine will generally be the same. The remaining one valence bond will bear an alkyl group or an aryl group. Generally these alkyl groups will contain up to about 24 carbon atoms, preferably 18 arbon atoms and may be of a branched or straight chain structure. The aryl groups are aromatic mono and polycarbocyclic structures optionally substituted with inert groups such as alkyl, alkoxy and the like. While phenyl is the most common species, groups such as tolyl, naphthyl, chrysyl, anthracyl, t-butylphenyl, and the like are embraced.

The foregoing two reactancts are generally employed in substantially equimolar amounts although an excess of the phosphorus halide can be employed. These reactants are combined with at least an equimolar amount, and generally a slight excess, of a complexing metal halide Lewis acid as for example aluminum chloride, ferric chloride, stannic chloride, boron trifluoride, titanium chloride, zinc chloride, zirconium chloride and the like. The process is preferably practiced by first dissolving or suspending the metal halide in a nonaqueous inert aprotic solvent such as nitromethane, dichloromethane, nitrobenzene, nitropropane, chlorobenzene, dichlorobenzenes, s-dichloroethane, tetrachloroethane, perchloroethylene, petroleum ether, carbon disulfide and the like, generally at temperatures of 0°C or lower, and then adding the two reactants to the reaction mixture. The reaction is then allowed to progress, with cooling if necessary, under an inert atmosphere such as nitrogen or helium and anhydrous conditions.

To obtain the substituted phosphinic acids of this invention, the reaction mixture containing the complexed intermediate is then treated with water. The water is added in an excess of the amount needed to dissociate the complex, rate of addition being adjusted to avoid an overly rapid generation of heat. The product is isolated through the use of conventional techniques such as solvent extraction, evaporation, centrifugation or the like and further purified if necessary through recrystallization, chromatography or the like.

To obtain the substituted phosphinates of this invention, the reaction mixture containing the complexed intermediate is first treated with an equivalent amount of an alcohol. This alcohol may be simple alkyl or aryl alcohol such as methanol, ehtanol, octadecanol, dodecanol, and the like or may be a halogenated alkanol such as 3-chloropropanol, or an alkane polyol such as ethylene glycol, neopentylglycol, pentaerythritol or the like or an alkenylol such as allyl alcohol and the like. While there is no operative limit on the length of the alkyl chain, it will generally contain up to 24 carbon atoms and more usually up to 18 carbon atoms. Following addition of the alcohol, the reaction complex is dissociated with water as previously described. Substituted phosphinates such as m-octadecyl (3,5-di-tert.-butyl-4-hydroxybenzyl)ethanephosphinate can be prepared by preparing the acid chloride of the appropriate phosphinic acid and reacting it with an alcohol.

Generally, in the practice of the dissociation step, mere addition of water is sufficient. For some particularly tightly bound complexes, the application of heat and/or the addition of base may be necessary. In the case of addition of base, the quantity may be sufficient to neutralize phosphinic acid product and in such instances, the product will be the salt of these acids, the cation being that of the base.

The following examples aare presented to further illustrate the present invention without introducing any limitation thereto.

EXAMPLE 1

2,2-Dimethyl-3-hydroxypropyl (3,5-di-t-butyl-4-hydroxybenzyl)benzenephosphinate

A solution of 14.7 g of aluminum chloride (0.110 moles) in 50 ml of nitromethane was added dropwise at −15° to −12°C over a period of 15 minutes to a solution of 25.4 g of 3,5-di-t-butyl-4-hydroxybenzyl chloride (0.100 moles) and 18.7 g of dichlorophenylphosphine (0.105 moles) in 50 ml of nitromethane. The reaction mixture was stirred at −12°C for 45 minutes and 14 g of neopentyl glycol are added gradually over a period of 10 minutes, the temperature being allowed to rise from −10° to 0°C. The reaction mixture was then stirred at 18° to 22°C for 3 hours and 100 ml of water are added in a dropwise fashion at −10° to +15°C. The aqueous dispersion was extracted with 300 ml of ether and the extract washed with 100 ml of 2 percent aqueous hydrochloric acid, dried over anhydrous sodium sulfate and evaporated to yield 2,2-dimethyl-3-hydroxypropyl(3,5-di-t-butyl-4-hydroxybenzyl)benzene-phosphinate which was further purified through recrystallization from 11:1 heptane: toluene, M.P. 113°–115°C.

By substituting dichlorooctadecylphosphine for dichlorophenylphosphine in the above procedure, there is obtained 2,2-dimethyl-3-hydroxypropyl(3,5-di-t-butyl-4-hydroxybenzyl)octadecanephosphinate.

EXAMPLE 2

(3,5-Di-tert.butyl-4-hydroxybenzyl-ethanephosphinic Acid

A solution of 14.7 grams of aluminum chloride (0.110 moles) in 50 ml of nitromethane was added at −10° to −5°C over 15 minutes to a solution of 13.1 grams of ethyl dichlorophosphine (0.100 moles) and 25.4 grams of 3,4-di-tert.-butyl-4-hydroxybenzyl chloride (0.100 moles). The reaction mixture was then stirred at −5° to 0°C for 2 hours. The reaction mixture was then poured onto about 300 grams of ice and allowed to stand overnight and then extracted with 2×300 ml of toluene, the toluene solution being dired over anhydrous sodium sulfate. The filtered toluene solution was evaporated at a reduced pressure yielding 30 grams of a white glass as residue. The product was crystallized from acetonitrile, the crystals being washed with n-heptane. After drying the product melted at 155°–157°C.

EXAMPLE 3 n-Octadecyl(3,4-di-tert.-butyl-4-hydroxybenzyl)-ethane phosphinate 5.7 Grams of (3,5-di-tert.-butyl-4-hydroxybenzyl)ethane-phosphinic acid was dissolved in 100 ml of toluene. 2.1 Grams of thionyl chloride was added to the toluene solution, followed by two drops of dimethylformamide, the reation mixture being stirred for about 16 hours at room temperature. 1.9 Grams of triethyl amine was added followed by the dropwise addition of 4.9 grams of n-octadecanol dissolved in 20 ml of toluene. The reacton mixture was then stirred at room temperature for 3 hours, followed by 30 minutes at 90°C. The reaction mixture was cooled to 25°C and the precipitated triethylamine hydrochloride filtered. The product was recovered by removing the toluene by distillation at a reduced pressure, the residual oil being recrystallized twice from nitromethane and finally from a mixture of 200 ml of nitromethane and 25 ml acetone. After drying the white crystals melt at 63° to 65°C.

EXAMPLE 4

2-Chloroethyl-(3,5-di-tert.-butyl-4-hydroxybenzyl)-benzenephosphinate

A solution of 14.7 g of aluminum chloride (0.110 moles) in 50 ml of nitromethane was added dropwise over a period of 15 minutes at −15° to −10°C to a solution of 25.4 g of 3,5-di-tert.-butyl-4-hydroxybenzyl chloride (0.100 moles) and 18.7 g of dichlorophenyl phosphine (0.105 moles) in 50 ml of nitormethane. The mixture was stirred at −13°C for 45 minutes. Anhydrous ethylene glycol (7.2 g, 0.115 moles), dispersed in 252 ml of nitromethane, was added over a period of 10 minutes at −10°C and stirred for 3 hours at 20°C and at 55°C for 2 hours. The reaction mixture was then cooled to 10°C and 100 ml of water added at 10° to 22°C. On stirring for 16 hours at room temperature white crystals precipitated which, after drying, melt at 135°–138°C (30.7 g). After recrystallization from nitromethane, the melting point of the product was 139°–140°C.

EXAMPLE 5

By substituting allylalcohol in the procedure of Example 1, there was obtained allyl-(3,5-di-tert.-butyl-4-hydroxybenzyl)-benzenephosphinate, M.P. 105°–106°C.

EXAMPLE 6

A batch of unstabilized polypropylene powder (Hercules Profax 6501) was thoroughly blended with 0.5 percent by weight of n-octadecyl(3,5-di-t-butyl-4-hydroxybenzyl)ethanephosphinate and another batch with 0.1 percent by weight of n-octadecyl(3,5-di-tert.-butyl-4-hydroxybenzyl)ethanephosphinate plus 0.3 percent by weight of DSTDP. The blended materials were then milled on a two-roller mill at 182°C for 10 minutes, after which time the stabilized polypropylene was sheeted from the mill and allowed to cool.

The polypropylene sheets were then cut into pieces and pressed for seven minutes on a hydraulic press at 281°C., and 2,000 pounds per square inch pressure. The resultant sheets of 25 mil thickness were tested for resistance to accelerated aging in a forced draft oven at 150°C. The results are set out in Table I below.

TABLE I

| %Concentration of Stabilizer | Oven Aging — 150°C. 25 mil Film Hours |
| --- | --- |
| 0.5 | 185 |
| 0.1 + 0.3 DSTDP[1] | 500 |
| Polypropylene (Unstabilized) | 3 |

(1) distearylthiodipropionate

The above data clearly shows the significant stabilization of polypropylene upon the addition of the antioxidants of the present invention.

EXAMPLE 7

39.3 Grams of nylon 6,6 salt, 0.177 gms. of hexamethylene diamine diacetate and 0.5 percent by weight of 2,2-dimethyl-3-hydroxypropyl-(3,5-di-tert.-butyl-4-hydroxyphenyl)benzenephosphinate were mixed in a standard glass polymer tube with a side arm. The tube was evacuated and flashed four times with high purity dry nitrogen. The tube was heated for 1 hour in a 222°C methyl salicylate vapor bath during which time water was eliminated. The tube was then placed in a second vapor bath at 275°C (orthophenyl phenol) for 1 hour and then evacuated to 0.1 mm for an additional ½ hour. The tube was removed from the heat and nitrogen introduced.

The nylon plug was ground to about 20 mesh granules. Initial viscosity of the nylon in reagent grade sulfuric acid (0.5 percent by weight) was determined at 30°C. The granules were aged for 65 hours at 140°C in a forced draft oven, after which time the viscosity of the nylon was again determined and reported as to percent retention of original viscosity.

The thus stabilized nylon 6,6 showed a 91 percent retention of viscosity after testing while the blank containing no stabilizer showed only a 62 percent retention of viscosity.

EXAMPLE 8

A water-white, refined (U.S.P grade) mineral oil (Esso PRIMOL D) was stabilized under the following test conditions.

A sample of the mineral oil (10 gms) containing 0.1% by weight allyl (3,5-di-tert.-butyl-4-hydroxybenzyl)benzenephosphinate was placed in a Sligh type oxidation flask filled with oxygen at room temperature (25°C) and atmospheric pressure. Thereafter, the flask was sealed to form a system having a mercury manometer which measures the pressure changes as oxygen was absorbed by the sample in the flask. The sample was then heated at 150°C until the manometer registered a decrease of 300 mm.Hg pressure within the flask with reference to the maximum pressure obtained at 150°C. The results are set out in Table II below:

TABLE II

| % Concentration of stabilizer | Hours to failure at 150°C |
| --- | --- |
| Unstabilized oil | 2.5 |
| 0.1 | 17.5 |

What is claimed is:

1. An alkylated hydroxyphenylalkylphosphonate of the formula

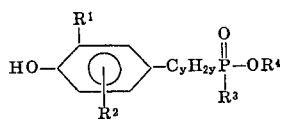

wherein $R^1$ is an alkyl group of from one to six carbon atoms;

$R^2$ is alkyl in a position adjacent to the hydroxy group or in a position meta to the hydroxy group and para to $R^1$, said alkyl group having up to 6 carbon atoms;

$R^3$ is from one to 18 carbon atoms, phenyl, tolyl or naphthyl;

$R^4$ is hydrogen, hydroxy(lower)alkyl, alkenyl of from three to six carbon atoms, chloro(lower)alkyl, bromo(lower)alkyl, iodo(lower)alkyl, or alkyl of from one to 18 carbon atoms, provided that $R^3$ is not phenyl when $R^4$ is alkyl or hydrogen; and $y$ is a number from 1 to 3.

2. A compound according to claim 1 wherein $R^1$ and $R^2$ are tertiary alkyl groups $R^3$ is ethyl $R^4$ is an alkyl group from 1 to 18 carbon atoms or hydrogen; and $y$ is 1.

3. A compound according to claim 1 wherein $R^1$ and $R^2$ are tertiary alkyl groups;

$R^3$ is phenyl;

$R^4$ is hydroxy(lower)alkyl, alkenyl of from three to six carbon atosoms, chloro(lower)alkyl, bromo(lower)alkyl, or iodo(lower)alkyl; and $y$ is 1.

4. A compound according to claim 1 which is (3,5-di-tert.-butyl-4-hydroxybenzyl)ethanephosphinic acid.

5. A compound according to claim 1 which is 2,2-dimethyl-3-hydroxypropyl-(3,5-di-tert.-butyl-4-hydroxybenzyl)benzenephosphinate.

6. A compound according to claim 1 which is allyl-(3,5-di-tert.-butyl-4-hydroxybenzyl)benzenephosphinate.

7. A compound according to claim 1 which is n-octadecyl-(3,5-di-tert.-butyl-4-hydroxybenzyl)ethanephosphinate.

8. A compound according to claim 1 which is 2-chloroethyl-(3,5-di-tert.-butyl-4-hydroxybenzyl)benzenephosphinate.

* * * * *